United States Patent
Ando

(10) Patent No.: US 7,969,115 B2
(45) Date of Patent: Jun. 28, 2011

(54) MOTOR DRIVE CIRCUIT AND ELECTRONICS

(75) Inventor: Motohiro Ando, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 529 days.

(21) Appl. No.: 11/780,073

(22) Filed: Jul. 19, 2007

(65) Prior Publication Data

US 2008/0019677 A1   Jan. 24, 2008

(30) Foreign Application Priority Data

Jul. 24, 2006   (JP) .................................. 2006-200435

(51) Int. Cl.
*G05B 19/40* (2006.01)
(52) U.S. Cl. ........................................ 318/685; 318/696
(58) Field of Classification Search .................. 318/560, 318/568.16, 569, 599, 603, 685, 690, 280, 318/400.01, 400.14, 700, 727, 696
See application file for complete search history.

(56) References Cited

U.S. PATENT DOCUMENTS

| | | | | |
|---|---|---|---|---|
| 4,282,472 A * | 8/1981 | Martin | | 318/696 |
| 4,367,435 A * | 1/1983 | Bailey et al. | | 318/257 |
| 4,751,445 A * | 6/1988 | Sakai | | 318/696 |
| 5,157,515 A * | 10/1992 | Hasegawa | | 358/412 |
| 5,177,626 A * | 1/1993 | Nosaki et al. | | 358/486 |
| 5,208,523 A * | 5/1993 | Harman | | 318/685 |
| 5,491,397 A * | 2/1996 | Hirakawa | | 318/696 |
| 6,181,093 B1 * | 1/2001 | Park et al. | | 318/400.34 |
| 6,208,107 B1 * | 3/2001 | Maske et al. | | 318/685 |
| 6,222,340 B1 * | 4/2001 | Kawabata et al. | | 318/685 |
| 6,384,566 B1 * | 5/2002 | Wen | | 318/727 |
| 6,414,460 B1 * | 7/2002 | Li et al. | | 318/685 |
| 6,597,147 B2 * | 7/2003 | Li et al. | | 318/696 |
| 7,095,155 B2 * | 8/2006 | Takeuchi | | 310/266 |
| 7,211,974 B2 * | 5/2007 | Takeuchi | | 318/280 |
| 7,271,554 B2 * | 9/2007 | Aizawa | | 318/34 |
| 2006/0033804 A1 * | 2/2006 | Dan | | 347/230 |
| 2007/0001642 A1 * | 1/2007 | Yoshihisa | | 318/696 |

FOREIGN PATENT DOCUMENTS

| | | |
|---|---|---|
| JP | 08-037799 | 2/1996 |
| JP | 08-149892 | 6/1996 |

* cited by examiner

*Primary Examiner* — Walter Benson
*Assistant Examiner* — Antony M Paul
(74) *Attorney, Agent, or Firm* — Fish & Richardson P.C.

(57) ABSTRACT

A drive circuit drives a motor in a mode selected from first and second modes. A drive unit operates in response to a control signal received from a signal generation unit to control how the motor should rotate. The control signal is applied to drive the motor in the first mode. The signal generation unit receives a select signal indicating one of the first and second modes. When the select signal indicates the first mode, the signal generation unit outputs an input signal as the control signal. When the select signal indicates the second mode, the signal generation unit generates the control signal in accordance with the input signal. A motor drive circuit capable of driving a motor regardless of a difference between input modes in type, and electronics equipped with, can thus be obtained.

10 Claims, 8 Drawing Sheets

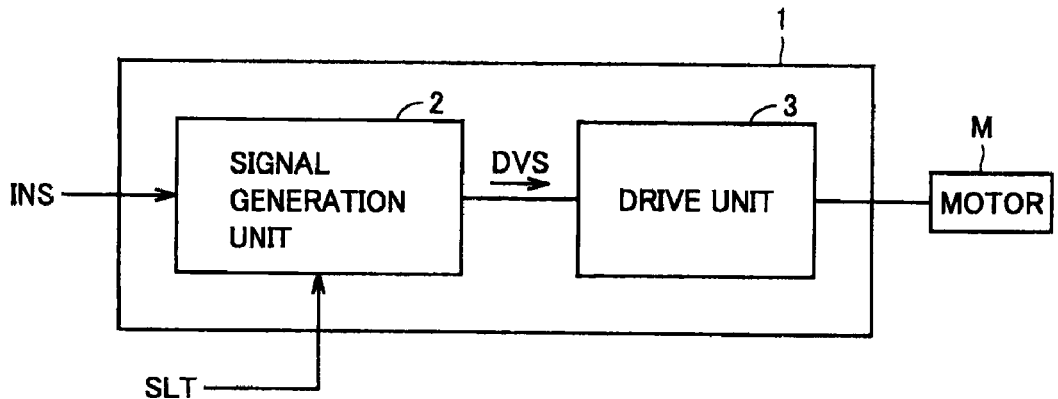
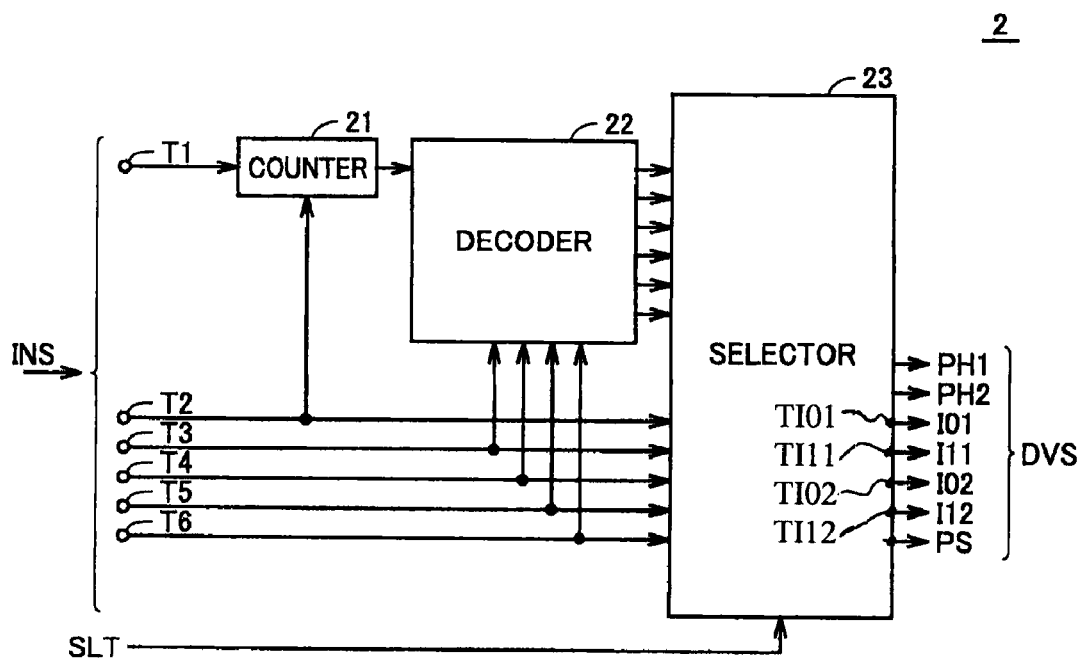

FIG.3

| SLT | L | H |
|---|---|---|
| INPUT MODE | CLOCK INPUT MODE | PARALLEL INPUT MODE |
| T1 | CLK | — |
| T2 | PS | PS |
| T3 | MODE0 | PH1 |
| T4 | MODE1 | PH2 |
| T5 | CW_CCW | ENBLE1 |
| T6 | ENABLE | ENBLE2 |

QUARTER STEP

HALF STEP

MOTOR DRIVE CIRCUIT AND ELECTRONICS

BACKGROUND OF THE INVENTION

1. Field of the Invention

The present invention relates to motor drive circuits and electronics and particularly to motor drive circuits capable of driving motors regardless of a difference between input modes in type and electronics equipped therewith.

2. Description of the Background Art

Stepping motors characteristically have an angle of rotation varying in proportion to the number of pulses input. Conventionally, how a stepping motor should be rotated has been controlled by controlling a current passing through the stepping motor.

For example Japanese Patent Laying-open No. 8-149892 discloses a stepping motor drive device receiving a signal indicating in which direction a stepping motor should rotate and a pulse signal to drive the stepping motor. This drive device operates in accordance with the stepping motor's drive mode to vary a pattern of a current passing through a stator of the motor. If the drive device switches a current pattern between a first current pattern and a second current pattern the drive device switches the current pattern such that the motor generates the same torque.

Another example is a stepping motor drive device disclosed in Japanese Patent Laying-open No. 8-037799. When this drive device switches an excitation mode from a first excitation mode to a second excitation mode the drive device does so after the motor has completely shifted from a first step to a second step.

Note that a stepping motor has an excitation mode including W1-2 phase excitation, 1-2 phase excitation, 2 phase excitation, and the like. W1-2 phase excitation is an excitation mode allowing an exciting current to be controlled to render an angle of rotation per step smaller than a fundamental step angle. It is also referred to as "microstep driving." The angle of rotation of W1-2 phase excitation per step is ½ of that of 1-2 phase excitation and ¼ of that of 2 phase excitation. Accordingly, 2 phase excitation, 1-2 phase excitation and W1-2 phase excitation are also referred to as full step excitation, half step excitation and quarter step excitation, respectively.

In most cases, stepping motor drive circuits utilize a current chopper circuit capable of controlling an output current to be constant. For example if a stepping motor is driven in a W1-2 phase excitation mode the current chopper circuit receives a control signal, which is divided mainly in two types (or input modes, as will be referred to hereinafter). These two types of input modes will hereinafter be referred to as a "clock input mode" and a "parallel input mode".

FIG. 13 is a diagram for illustrating how the clock input mode and the parallel input mode are distinguished.

With reference to FIG. 13, a drive circuit 101 drives a motor M, which is a stepping motor. For the clock input mode, drive circuit 101 receives four types of signals CLK, CW_CCW, and MODE0 and MODE1. Signal CLK is a clock signal. Whenever signal CLK rises (or falls) drive circuit 101 rotates motor M by a predetermined angle. Signal CW_CCW is a signal controlling in which direction (i.e., clockwise or counterclockwise as seen with respect to the axis of rotation) motor M should rotate. Signals MODE0 and MODE1 are signals that determine the stepping motor's excitation modes (or predetermined angles, as aforementioned).

For the parallel input mode, drive circuit 101 receives six types of signals PH1 and PH2, and I01, I11, I02 and I12. Signals PH1 and PH2 indicate which polarity an exciting current that passes through the stepping motor has. Signal I01, I11, I02, I12 indicate an exciting current in amount. Signals PH1, and I01 and I11 in combination indicate an exciting current of one phase in polarity and amount (or level). Signals PH2, and I02 and I12 in combination indicate an exciting current of another phase in polarity and amount (or level).

As shown in FIG. 13, the clock input mode and the parallel input mode employ significantly different types of control signals, respectively. As such, if a stepping motor and its drive circuit are mounted in some equipment, one of the two types of drive circuits must be selected. Which one of the two types of drive circuits is selected is determined by the specification of the equipment.

For example if the input mode of the drive circuit mounted in the equipment is the clock input mode, it is difficult to replace the drive circuit with that of the parallel input mode, since the equipment would be significantly changed in design. This can be an obstacle for example in selling drive circuits of the parallel input mode. While herein a drive circuit of the parallel input mode has been described by way of example, that of the clock input mode is also similarly discussed. Solving such problem requires a designer to develop two types of drive circuits. This, however, imposes an increased burden on the designer.

SUMMARY OF THE INVENTION

The present invention contemplates a motor drive circuit capable of driving a motor regardless of a difference between input modes in type, and electronics equipped therewith.

In summary, the present invention provides a motor drive circuit driving a motor drivable in first and second modes. The motor drive circuit includes a drive unit and a signal generation unit. The drive unit drives the motor in the first mode in response to a control signal applied to control the motor in the first mode. The signal generation unit precedes the drive unit. The signal generation unit receives an input signal applied to drive the motor in a mode selected from the first and second modes, and a select signal indicating the mode selected. When the first mode is selected, the signal generation unit outputs the input signal as the control signal. When the second mode is selected, the signal generation unit generates the control signal in accordance with the input signal.

Preferably, when the second mode is selected, the signal generation unit generates the control signal based on the input signal including a signal indicating an angle of rotation per unit time of the motor and a signal indicating the unit time. The control signal includes signals indicating in amount and polarity, respectively, an exciting current passing through the motor.

More preferably, the signal generation unit includes a conversion unit and a select unit. The conversion unit converts the input signal to the control signal. The select unit receives the select signal, the input signal and a signal output from the conversion unit, and also operates in response to the select signal to select as the control signal one of the input signal and the signal output from the conversion unit.

More preferably, the motor is a stepping motor.

More preferably, the motor is a DC motor.

The present invention in another aspect provides electronics including a motor drivable in first and second modes and a drive circuit driving the motor. The drive circuit includes a drive unit and a signal generation unit. The drive unit drives the motor in the first mode in response to a control signal applied to control the motor in the first mode. The signal generation unit precedes the drive unit. The signal generation unit receives an input signal applied to drive the motor in a mode selected from the first and second modes, and a select signal indicating the mode selected. When the first mode is selected, the signal generation unit outputs the input signal as the control signal. When the second mode is selected, the signal generation unit generates the control signal in accordance with the input signal.

Preferably, when the second mode is selected, the signal generation unit generates the control signal based on the input signal including a signal indicating an angle of rotation per unit time of the motor and a signal indicating the unit time. The control signal includes signals indicating in amount and polarity, respectively, an exciting current passing through the motor.

More preferably, the signal generation unit includes a conversion unit and a select unit. The conversion unit converts the input signal to the control signal. The select unit receives the select signal, the input signal and a signal output from the conversion unit, and also operates in response to the select signal to select as the control signal one of the input signal and the signal output from the conversion unit.

More preferably, the motor is a stepping motor.

More preferably, the motor is a DC motor.

Thus a main advantage of the present invention is that a motor can be driven regardless of a difference between modes in which a control signal is input.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows a configuration of a motor drive circuit in an embodiment.

FIG. 2 is a diagram for illustrating a configuration of a signal generation unit 2 shown in FIG. 1.

FIG. 3 indicates signals input to signal generation unit 2 shown in FIG. 2.

DESCRIPTION OF THE PREFERRED EMBODIMENTS

Hereinafter the present invention will be described in an embodiment with reference to the drawings. In the figures, identical or like components are identically denoted and will not be described repeatedly.

FIG. 1 shows a configuration of a motor drive circuit of the present embodiment.

With reference to FIG. 1, a motor drive circuit 1 receives a signal INS and in response thereto drives a motor M. Motor M is for example a stepping motor and drive circuit 1 is for example a semiconductor integrated circuit. Signal INS will be described later more specifically.

Drive circuit 1 drives motor M in a mode selected from first and second modes corresponding to the "parallel input mode" and the "clock input mode", respectively.

Drive circuit 1 includes a signal generation unit 2 and a drive unit 3.

Drive unit 3 operates in response to a control signal DVS to control how motor M should rotate. Control signal DVS is a signal indicating an exciting current that passes through motor M in polarity and amount (or level). Control signal DVS is a control signal for driving motor M in the first mode.

Signal generation unit 2 receives a signal SLT (a select signal) indicating which one of the first and second modes is selected. When the first mode is selected, signal generation unit 2 outputs signal INS as control signal DVS. When the second mode is selected, signal generation unit 2 generates control signal DVS as based on signal INS.

Figure 13:
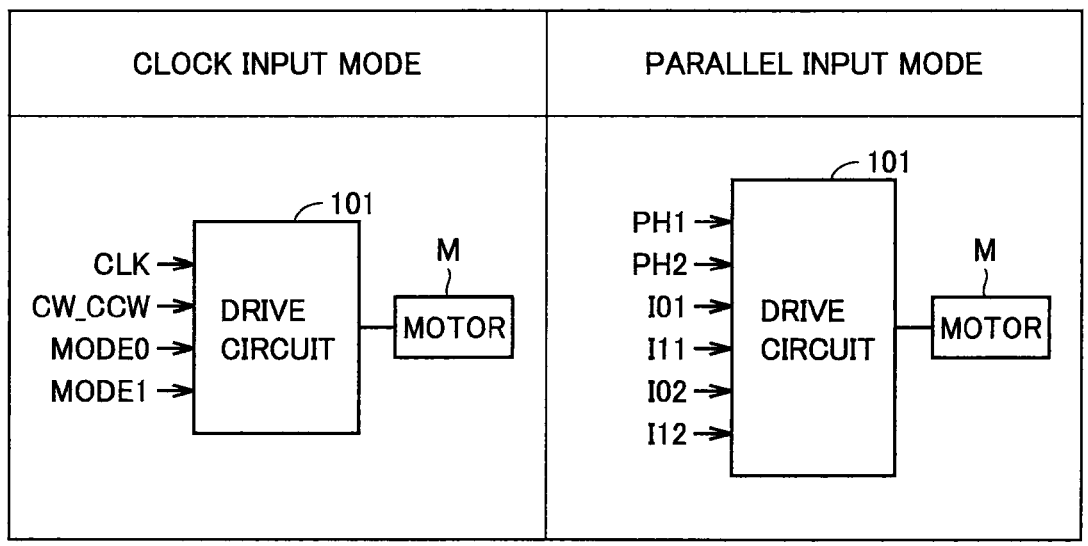
FIG. 13 shows how the clock input mode and the parallel input mode are different.

As shown in FIG. 13, conventional drive circuits have adopted different input interfaces for different types of control signals. Accordingly, different types of drive circuits have been provided for the different types of control signals, respectively. The present embodiment allows an input interface (signal generation unit 2) that can accommodate any of two types of control signals to be included to drive motor M whichever one of the two types the control signal of interest may be of.

More specifically, the present embodiment allows the clock input mode and the parallel input mode to be both made use of and can also compensate for their respective deficiencies.

The clock input mode allows a control device (e.g., a microcomputer or the like) and drive circuit 1 to be connected by a reduced number of signal lines. The reduced number of signal lines may, however, disadvantageously contribute to a reduced degree of freedom in controlling the stepping motor.

In contrast, the parallel input mode allows an increased degree of freedom in controlling the stepping motor. However, the control device and the drive circuit are connected by an increased number of signal lines. This results in the control device and the drive circuit disadvantageously having an increased number of terminals and hence increased sizes, respectively.

The present embodiment can accommodate the clock input mode and the parallel input mode without a significantly increased number of signal lines. It can thus provide an increased degree of freedom in controlling the stepping motor and prevent a significantly increased number of input terminals.

FIG. 2 is a diagram for illustrating a configuration of signal generation unit 2 shown in FIG. 1.

FIG. 3 indicates signals input to signal generation unit 2 shown in FIG. 2.

With reference to FIGS. 2 and 3, signal generation unit 2 includes input terminals T1-T6, a counter 21, a decoder 22 and a selector 23.

When signal SLT has a potential level of the low level, signal generation unit 2 has its input mode set to be the clock input mode. When signal SLT has a potential level of the high level, signal generation unit 2 has its input mode set to be the parallel input mode.

For the clock input mode, signals CLK, PS, MODE0 and MODE1, CW_CCW, and ENABLE are input to input terminals T1-T6, respectively.

Signal CLK is a clock signal. Signal CW_CCW is a signal controlling in which direction (i.e., clockwise or counterclockwise as seen with respect to the axis of rotation) motor M should rotate. Signals MODE0 and MODE1 are signals that determine the stepping motor's excitation mode (or the motor's angle of rotation). Signal ENABLE switches the FIG. 1 drive circuit 1 to operate/stop. In other words, signals MODE0 and MODE1, and CW_CCW are signals indicating an angle of rotation per unit time of motor M. Signal CLK (a clock signal) is a signal temporally representing the unit time. The motor rotates at a speed varying with the clock signal's period.

Counter 21 receives signals CLK and PS. Whenever signal CLK rises, counter 21 increments the current count value by one. When counter 21 receives signal PS, counter 21 resets the current count value to an initial value (for example of 0).

Decoder 22 decodes a count value received from counter 21 and signals MODE0 and MODE1, CW_CCW, and ENABLE to generate control signal DVS. In other words, decoder 22 is a conversion unit converting a received signal to control signal DVS.

Selector 23 for signal SLT having the low level outputs a signal output from decoder 22 and signal PS received, as control signal DVS. Control signal DVS includes signals PH1 and PH2, I01, I11, I02 and I12, and PS. Signals PH1 and PH2 indicate an exciting current of the stepping motor in polarity. Signals I01, I11, I02 and I12 indicate an exciting current in amount. Signal PS is a signal applied to stop an H bridge circuit 16 (see FIGS. 4 and 11), which passes an exciting current, from operating.

For the parallel input mode, input terminals T2-T6 receive signals PS, PH1 and PH2, and ENABLE1 and ENABLE2 which are in turn input to selector 23 directly. Note that for the parallel input mode, signal CLK is not input. If signal SLT has the high level, selector 23 outputs the received signal as control signal DVS.

It should be noted, however, that for the parallel input mode, selector 23 shorts terminals TI01 and TI11 outputting signals I01 and I11, respectively, and shorts terminals TI02 and TI12 outputting signals I02 and I12, respectively. In other words, signal I01 (and signal I11) correspond to signal ENABLE1 and signal I02 (and signal I12) correspond to signal ENABLE2.

The stepping motor is excited in full, half and quarter step excitation modes. For full step excitation and half step excitation, the motor drive circuit of the present embodiment can accommodate both the clock input mode and the parallel input mode.

For quarter step excitation, drive circuit 1 can accommodate only the clock input mode, since the parallel input mode requires at least two more input terminals, which are only used in the parallel input mode. The present embodiment employs a possible minimum number of input terminals to drive a motor. As such, for the parallel input mode, it can accommodate only full step excitation and half step excitation.

Figure 4:
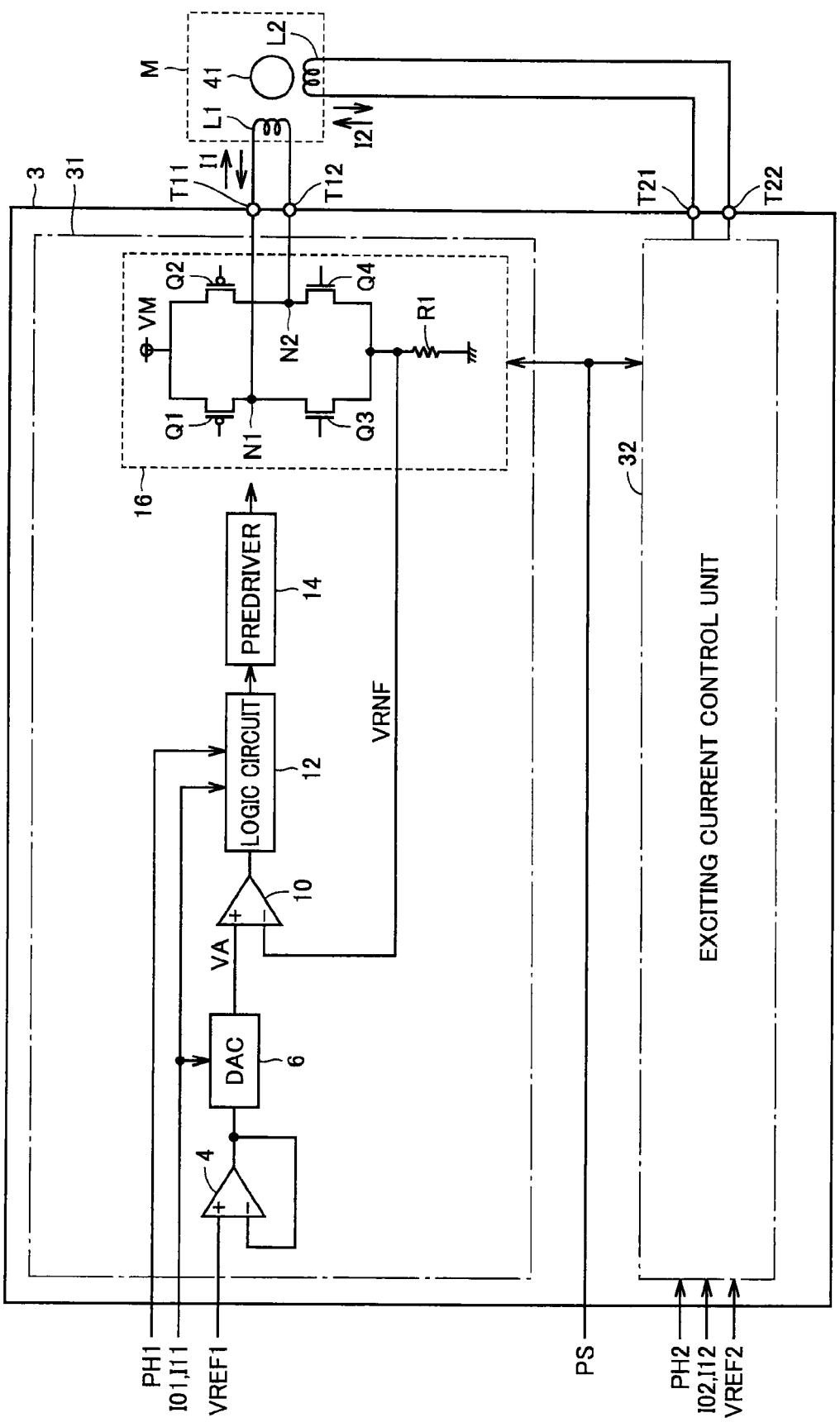
FIG. 4 shows an example in configuration of a stepping motor drive circuit in the embodiment.

FIG. 4 shows an example in configuration of the stepping motor drive circuit of the present embodiment.

With reference to FIG. 4, motor M includes exciting coils L1 and L2 corresponding to two phases, respectively, and a rotor 41.

Exciting coils L1 and L2 pass exciting currents I1 and I2, respectively. Drive unit 3 controls exciting currents I1 and I2 to each hold a set value.

Drive unit 3 includes exciting current control units 31 and 32. Exciting current control unit 31 is connected to exciting coil L1 at opposite ends to control exciting current I1. Similarly, exciting current control unit 32 is connected to exciting coil L2 at opposite ends to control exciting current I2.

Exciting current control units 31 and 32 are equivalent in configuration. Accordingly, exciting current control unit 31 will representatively be described in configuration and exciting current control unit 32 will not.

Exciting current control unit 31 includes an input buffer 4, a D/A converter (DAC) 6, a comparator 10, a logic circuit 12, a predriver 14, an H bridge 16, and a resistor R1.

Input buffer 4 receives a reference voltage VREF 1, which indicates an upper limit of exciting current I1. Note that input buffer 4 is a so called voltage follower circuit. Input buffer 4 receives reference voltage VREF1 and outputs it substantially as it is.

D/A converter 6 receives reference voltage VREF1 and signals I01 and I11 and outputs a voltage VA. Signals I0 and I11 vary their potential levels between the high and low levels. D/A converter 6 determines a ratio of voltage VA to reference voltage VREF1 by a combination of the potential levels of signals I01 and I11, respectively.

Resistor R1 converts a current passing through H bridge 16, i.e., exciting current I1, to a voltage VRNF. Comparator 10 compares voltage VA and voltage VRNF and provides a result thereof which is in turn output to logic circuit 12.

Logic circuit 12 generates a control signal based on signal PH1 indicating exciting current I1 in polarity and an output received from comparator 10. Predriver 14 receives the control signal from logic circuit 12 and amplifies the received control signal. Predriver 14 outputs a signal which is in turn provided to H bridge 16. In accordance with how H bridge 16 operates, exciting current I1 varies in magnitude.

If exciting current I1 attains a magnitude exceeding the upper limit, i.e., if comparator 10 provides an output indicating that voltage VRNF is larger than voltage VA, logic circuit 12 decreases exciting current I1. After logic circuit 12 starts to operate to decrease exciting current I1, a predetermined period of time elapses, when logic circuit 12 increases exciting current I1. Such operation is repeated to control exciting current I1 to hold the set value.

H bridge 16 includes p MOS transistors Q1 and Q2 and n MOS transistors Q3 and Q4. P and n MOS transistors Q1 and Q3, respectively, are connected in series between a power supply node receiving a power supply potential VM of motor M and one end of resistor R1. Similarly, p and n MOS transistors Q2 and Q4, respectively, are connected in series between the power supply node and one end of resistor R1. Resistor R1 has the other end connected to a ground node.

P and n MOS transistors Q1 and Q3, respectively, are connected to a node N1, which is connected to a terminal T11. Similarly, p and n MOS transistors Q2 and Q4, respectively, are connected to a node N2, which is connected to a terminal T12. Exciting coil L1 has two terminals connected to terminals T11 and T12, respectively.

If signal PS indicates that H bridge 16 should stop, H bridge 16 turns off p MOS transistors Q1 and Q2 and n MOS transistors Q3 and Q4.

Note that exciting current control unit 32 receives a reference voltage VREF2, and signals I02 and I12, and PH2. Reference voltage VREF2 indicates an upper limit of exciting current I12. Signals I02 and I12 indicate a ratio of the set value of exciting current I2 to the upper limit of exciting current I2. Signal PH2 indicates exciting current I2 in polarity.

Exciting current control unit 32 has an output connected to terminals T21 and T22. Exciting coil L2 has two terminals connected to terminals T21 and T22, respectively.

Figure 5:
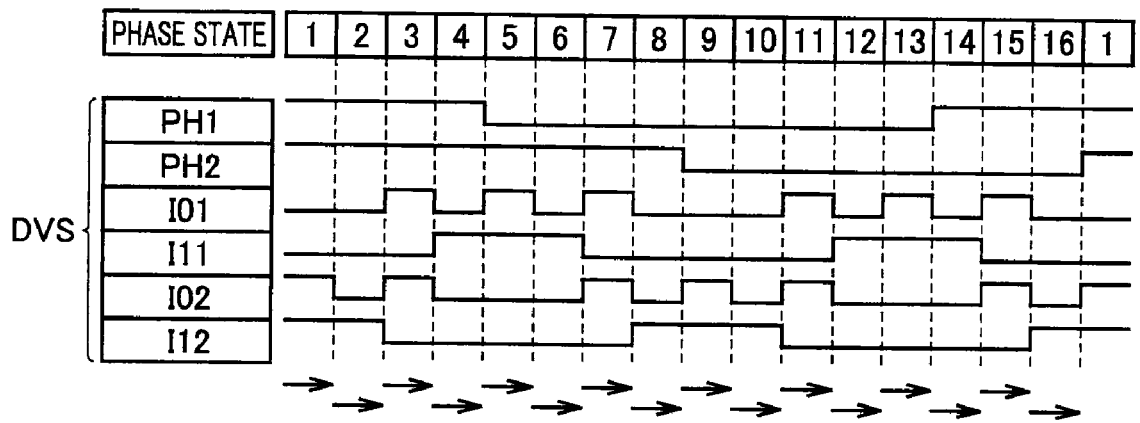
FIGS. 5 and 6 represent how a control signal DVS in quarter step excitation and half step excitation, respectively, varies with time.

FIG. 5 represents how control signal DVS in quarter step excitation varies with time.

With reference to FIG. 5, signals PH1, and I01 and I11 in combination indicate an exciting current of one phase in polarity and amount (or level). Similarly, signals PH2, and I02 and I12 in combination indicate an exciting current of another phase in polarity and amount.

Figure 6:
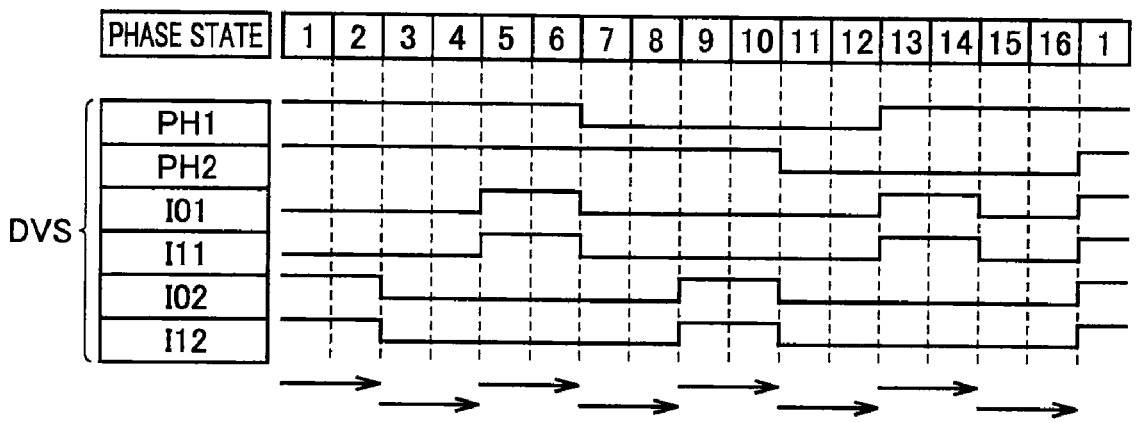

FIG. 6 represents how control signal DVS in half step excitation varies with time.

With reference to FIG. 6, in half step excitation, pairs of two adjacent phase states are formed, and in each pair, the exciting current of each phase is the same in polarity and amount. Accordingly, whenever a pair switches to a subsequent pair, in at least one phase an exciting current is switched in at least one of polarity and amount to allow the stepping motor to rotate at an angle of twice a step angle θs.

Note that while FIGS. 5 and 6 do not indicate signal PS, it is set at one of the high and low levels as its potential level sets the H bridge to an operative state.

Figure 7:
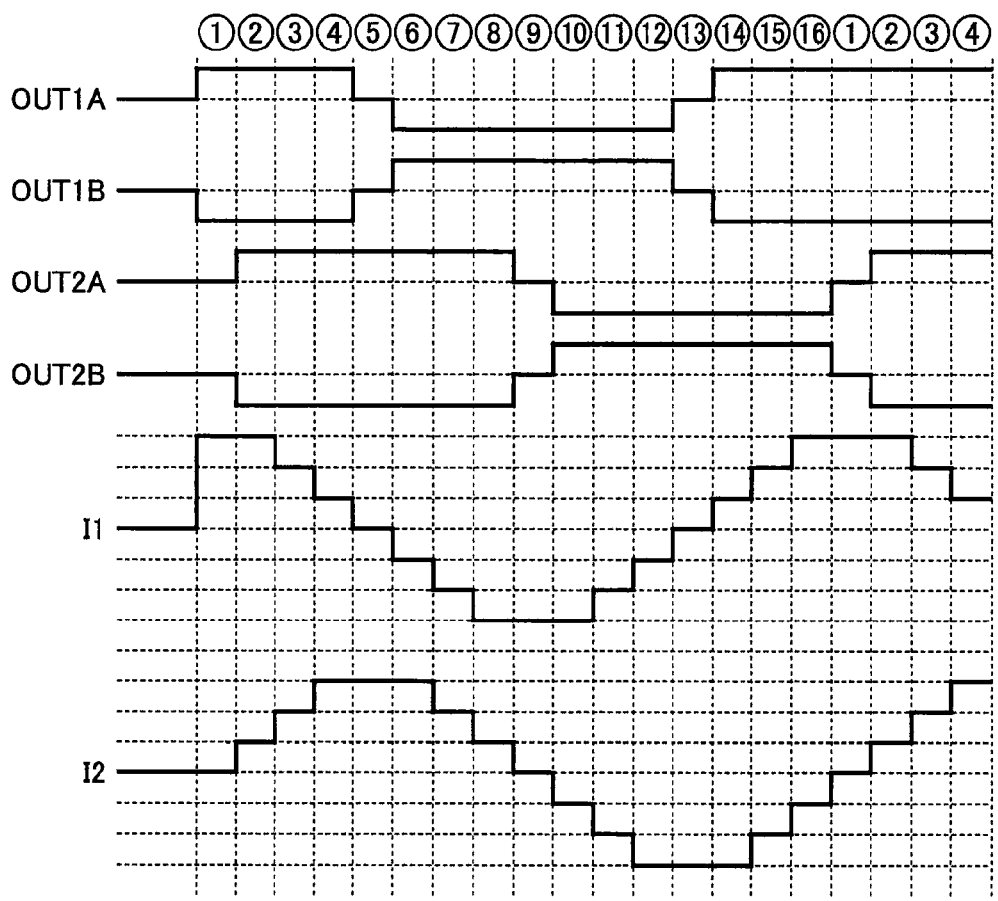
FIG. 7 represents how exciting currents I1 and I2 in quarter step excitation vary with time.

FIG. 7 represents how exciting currents I1 and I2 in quarter step excitation vary with time.

With reference to FIGS. 7 and 4, potentials OUT1A, OUT1B, OUT2A, OUT2B represent potentials at terminals T11, T12, T21, T22 shown in FIG. 4. Note that although not shown in FIG. 7, for the clock input mode, motor M (a stepping motor) is driven in quarter step excitation, and accordingly, signals MODE0 and MODE1 are both set high. Furthermore, signal CW_CCW is set low to rotate rotor 41 of the stepping motor clockwise.

With reference to FIGS. 7 and 5, FIG. 7 shows circled numbers of 1-16, which correspond to phase states 1-16 indicated in FIG. 5. Signal PH1 has low and high levels corresponding to the positive and negative polarities, respectively, of exciting current I1. Signals I01 and I11 indicate a current in amount in four levels, i.e., (I01, I11)=(L, L), (L, H), (H, L) and (H, H). Similarly, signal PH2 has low and high levels corresponding to the positive and negative polarities, respectively, of exciting current I2. Signals I02 and I12 also similarly indicate a current in amount in four levels by combinations of potential levels.

Figure 8:
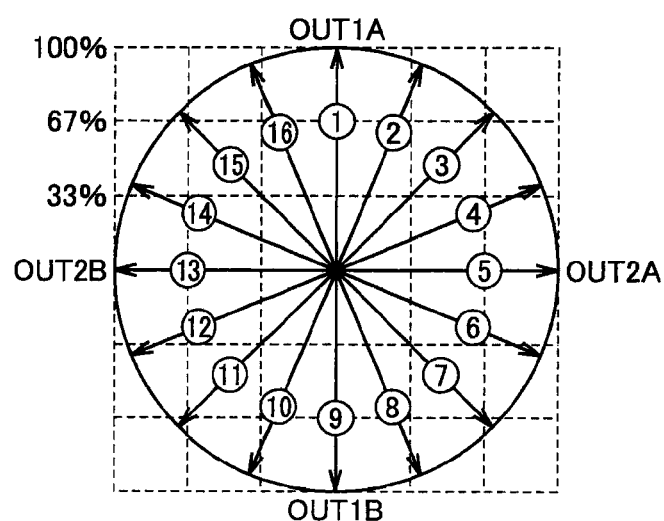
FIG. 8 is a diagram for illustrating a torque vector of motor M in quarter step excitation.

FIG. 8 is a diagram for illustrating a torque vector of motor M in quarter step excitation.

With reference to FIGS. 8 and 7, the stepping motor in quarter step excitation has step angle θs (or a minimum step angle) and the stepping motor's exciting coils L1 and L2 pass a current having a magnitude and a direction, as schematically indicated in the figures. For example if a current flows from terminals T11 to T12, an arrow indicating a torque vector is directed in a direction OUT1A. Furthermore, the torque vector has a magnitude, which indicates a ratio of exciting current I1 (I2) to the upper limit of exciting current I1 (I2) determined by signals I01, I11 (I02, I12). Furthermore, the vector's position indicates the motor's rotational position. In the present embodiment, step angle θs is 22.5 degrees (=360/16).

Figure 9:
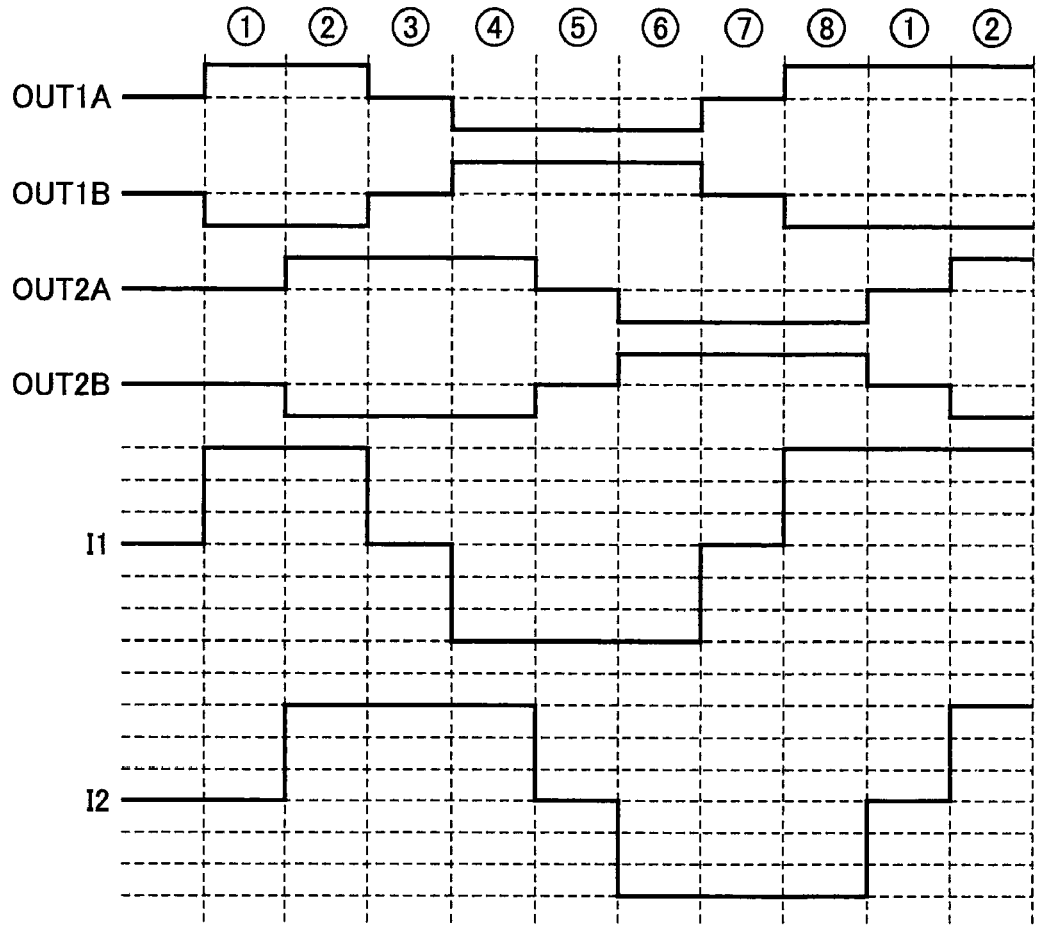
FIG. 9 represents how exciting currents I1 and I2 in half step excitation vary with time.

FIG. 9 represents how exciting currents I1 and I2 in half step excitation vary with time.

With reference to FIGS. 9 and 6, FIG. 9 shows circled numbers of 1-8, which correspond to pairs each formed of two phase states as shown in FIG. 5. Signals I01 and I11 indicate which one of two levels in amount, i.e., (L, L) and (H, H), a current has. In this case the exciting current is controlled to be one of a limit value and 0. Signals I02 and I12 are also similarly described.

Figure 10:
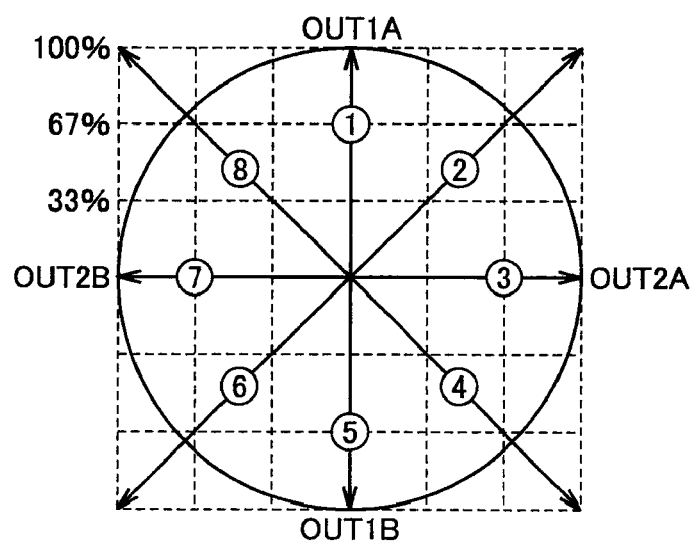
FIG. 10 is a diagram for illustrating a torque vector of motor M in half step excitation.

FIG. 10 is a diagram for illustrating a torque vector of motor M in half step excitation.

FIG. 10 shows that half step excitation employs a step angle corresponding to that in quarter step excitation multiplied by two, i.e., 45 degrees (=360/8).

Note that the type of motor that the motor drive circuit of the present embodiment can drive is not limited to a stepping motor.

Figure 11:
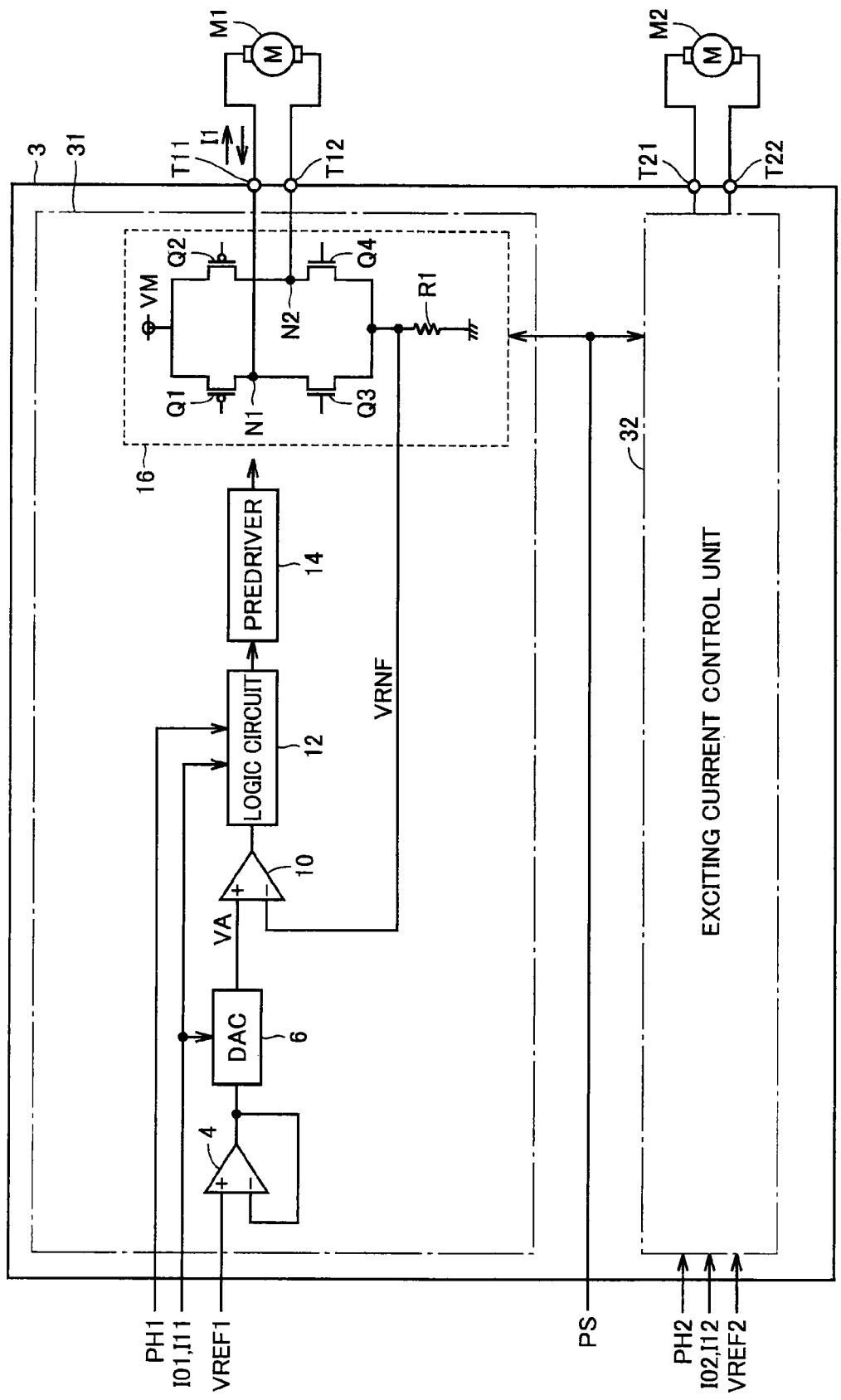
FIG. 11 is a diagram for illustrating an exemplary application of a motor drive circuit of the present embodiment.

FIG. 11 is a diagram for illustrating an exemplary application of the motor drive circuit of the present embodiment.

With reference to FIGS. 11 and 4, drive unit 3 is not connected to motor M (a stepping motor) but DC motors M1 and M2. In the parallel input mode, drive circuit 1 can drive DC motors M1 and M2 independently. It should be noted, however, that in the clock input mode DC motors M1 and M2 cannot be driven independently. In the present embodiment when drive circuit 1 drives a DC motor the input mode will be the parallel input mode.

Figure 12:
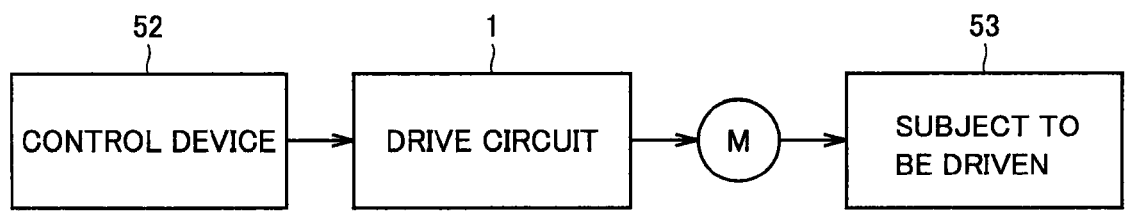
FIG. 12 is a schematic diagram of a configuration of electronics in which the motor drive circuit of the present embodiment is mounted.

FIG. 12 is a schematic diagram of a configuration of electronics in which the motor drive circuit of the present embodiment is mounted.

With reference to FIG. 12, electronics 51 include a control device 52, drive circuit 1, motor M, and a subject to be driven 53. Motor M may be a stepping motor or may be a DC motor. In the following description motor M is implemented by a stepping motor.

Signal INS shown in FIG. 1 is transmitted from control device 52 to drive circuit 1. Reference voltages VREF1 and VREF2 shown in FIG. 4 are also provided from control device 52 to drive circuit 1. The subject to be driven 53 is driven by motor M.

Electronics 51 are for example a printer, a facsimile, a copying machine or the like. The subject to be driven 53 is a sheet feed roller or the like.

In general, copying machines employ a large number of stepping motors. This necessitates an increased number of drive circuits 1. Accordingly, control device 52 is required to control the large number of drive circuits collectively. If a drive circuit of the parallel input mode is used for a copying machine, control device 52 will transmit signals to such drive circuits on a significantly increased number of signal lines and also process a significantly increased load. Accordingly in most copying machines a drive circuit of the clock input mode is adopted as a stepping motor drive circuit.

In contrast, electronics, such as a printer, having a small number of stepping motors (and hence a small number of drive circuits) often allow control device 52 to have leeway in processing a load, and accordingly often adopt a drive circuit of the parallel input mode. Thus, different types of electronics adopt drive circuits of different input modes. The present invention can readily accommodate such difference.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor drive circuit operable in a first mode in response to an input signal according to a parallel input and operable in a second mode in response to an input signal according to a clock input mode, the motor drive circuit comprising:

a signal generation unit arranged to output a control signal according to the parallel input mode in response to the parallel input mode input signal when operated in the first mode and to generate and output a control signal according to the parallel input mode in response to the clock input mode input signal when operated in the second mode; and a drive unit arranged to drive a motor, in response to the control signal according to the parallel input mode in both the first and second modes, wherein the parallel input mode input signal and the control signal include information indicating an amount of exciting current passing through the motor, and wherein the clock input mode input signal includes information indicating an angle of rotation per unit time of the motor and information indicating the unit time.

2. The motor drive circuit according to claim 1, wherein the motor is a stepping motor.

3. The motor drive circuit according to claim 1,
wherein the parallel input mode input signal and the control signal include information indicating a polarity of exciting current that passing through the motor, and
wherein the clock input mode input signal includes information indicating a direction of rotating the motor.

4. The motor drive circuit according to claim 1, wherein the signal generation unit includes a conversion unit arranged to convert the clock input mode input signal into the control signal according to the parallel input mode in the second mode.

5. The motor drive circuit according to claim 1, further comprising an input for a select signal to select between the first and second modes of the signal generation unit.

6. The motor drive circuit according to claim 1, further comprising a plurality of input terminals common in use for inputting the input signal and the clock input mode input signal.

7. The motor drive circuit according to claim 1, wherein the motor is a DC motor, and the control signal is for controlling the DC motor.

8. An apparatus comprising:
a motor drive circuit operable in a first mode in response to a an input signal according to a parallel input mode and operable in a second mode in response to an input signal according to a clock input mode, the motor drive circuit including:

a signal generation unit arranged to output a control signal according to the parallel input mode in response to the parallel input mode input signal when operated in the first mode and to generate and output a control signal according to the parallel input mode in response to the clock input mode input signal when operated in the second mode, and a drive unit arranged to drive a motor, in response to the control signal according to the parallel input mode in both the first and second modes; and a motor arranged to be driven by the motor drive circuit, wherein the parallel input mode input signal and the control signal include information indicating an amount of exciting current passing through the motor, and wherein the clock input mode input signal includes information indicating an angle of rotation per unit time of the motor and information indicating the unit time.

9. The apparatus according to claim 8, wherein the motor is a stepping motor.

10. The apparatus according to claim 8, wherein the motor is a DC motor.

* * * * *